United States Patent
Zenner et al.

(10) Patent No.: US 11,597,252 B2
(45) Date of Patent: Mar. 7, 2023

(54) PLUG-IN ELECTRIC VEHICLE AND METHOD FOR HEATING A PASSENGER CABIN

(71) Applicant: FORD GLOBAL TECHNOLOGIES, LLC, Dearborn, MI (US)

(72) Inventors: Thomas Zenner, Dueren (DE); Daniel Benjamin Kok, Ann Arbor, MI (US); Timothy Noah Blatchley, Dearborn, MI (US); Mark G. Smith, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 398 days.

(21) Appl. No.: 16/849,177

(22) Filed: Apr. 15, 2020

(65) Prior Publication Data
US 2020/0338953 A1 Oct. 29, 2020

(30) Foreign Application Priority Data

Apr. 25, 2019 (EP) .................................... 19171090

(51) Int. Cl.
*B60H 1/00* (2006.01)
*B60L 58/27* (2019.01)
*B60L 53/10* (2019.01)

(52) U.S. Cl.
CPC ......... *B60H 1/00499* (2019.05); *B60H 1/004* (2013.01); *B60L 58/27* (2019.02); *B60H 1/00278* (2013.01); *B60L 53/10* (2019.02)

(58) Field of Classification Search
CPC ................ B60H 1/00499; B60H 1/004; B60H 1/00278; B60L 58/27; B60L 53/10
See application file for complete search history.

(56) References Cited

U.S. PATENT DOCUMENTS 5,407,130 A 4/1995 Uyeki et al.
5,467,006 A * 11/1995 Sims .................... B60H 1/2218
320/155

(Continued)

FOREIGN PATENT DOCUMENTS

DE 102009028330 A1 2/2011

OTHER PUBLICATIONS

Ohno, Hiroyuki et al. Development of Waste Thermal Energy Recovery Heat Pump. Calsonic Kansei Technical Review vol. 11 2014. 6 pages.

(Continued)

*Primary Examiner* — David J Teitelbaum
(74) *Attorney, Agent, or Firm* — Brooks Kushman PC; David Kelley (57) ABSTRACT

An electrified vehicle and method for heating a passenger cabin of an electrified vehicle that may include an internal combustion engine in addition to an electric machine and a traction battery for supplying the electric machine control an electric heating element to store thermal energy while the vehicle is connected to an external power source that is also used to charge the traction battery, and to extract stored thermal energy during operation of the vehicle with the electric heating element turned off to extend the electric driving range of the vehicle while also providing heat to the passenger cabin. The electric heating element may positioned and controlled to heat one or more elements directly by mechanical contact, or indirectly by heating a circulating liquid coolant to a temperature above a current or anticipated external ambient temperature.

17 Claims, 5 Drawing Sheets

(56) References Cited

U.S. PATENT DOCUMENTS

| | | | |
|---|---|---|---|
| 5,647,534 | A | 7/1997 | Kelz et al. |
| 6,213,233 | B1* | 4/2001 | Sonntag .................. B60K 6/22 |
| | | | 165/41 |
| 8,887,843 | B2 | 11/2014 | Piccard et al. |
| 2010/0089669 | A1 | 4/2010 | Taguchi |
| 2010/0236769 | A1 | 9/2010 | Lyons et al. |
| 2011/0298241 | A1 | 12/2011 | Varns et al. |
| 2012/0152511 | A1 | 6/2012 | Chang et al. |
| 2014/0216709 | A1* | 8/2014 | Smith ................ B60H 1/00392 |
| | | | 165/41 |
| 2015/0174986 | A1* | 6/2015 | Satzger ............. B60H 1/00921 |
| | | | 165/41 |
| 2015/0266392 | A1* | 9/2015 | Arai ....................... B60L 53/14 |
| | | | 320/150 |
| 2016/0153343 | A1* | 6/2016 | Kakehashi ........... B60H 1/3228 |
| | | | 123/41.31 |
| 2018/0086177 | A1* | 3/2018 | Agathocleous ......... B60L 58/26 |
| 2021/0300199 | A1* | 9/2021 | Legnedahl ................ B60L 1/02 |

OTHER PUBLICATIONS

Tuttle, AI. Electric vehicle heating and cooling. Automotive IQ. Nov. 21, 2017. 6 pages.

European Search Report for European Application No. EP 19171090.4, Completed by the European Patent Office, dated Oct. 22, 2019, 7 pages.

\* cited by examiner

PLUG-IN ELECTRIC VEHICLE AND METHOD FOR HEATING A PASSENGER CABIN

CROSS-REFERENCE TO RELATED APPLICATIONS

This application claims foreign priority benefits under 35 U.S.C. § 119(a)-(d) to EP Application 19 171 090.4 filed Apr. 25, 2019, which is hereby incorporated by reference in its entirety.

TECHNICAL FIELD

The disclosure relates to a plug-in electric vehicle and method for heating a passenger cabin of a plug-in electric vehicle by storing thermal energy while the vehicle is on-plug.

BACKGROUND

In the field of vehicle engineering it is known, in the case of vehicles having conventional internal combustion engines, or in the case of hybrid vehicles, to utilize a waste heat produced during the operation of the internal combustion engine, to heat the passenger cabin. In longer voluntary or enforced pauses in the operation of the internal combustion engine, in which the passenger cabin is occupied by a driver and/or passengers, in many cases the heating of the passenger cabin by the waste heat of the internal combustion engine cannot be continued.

To solve this problem, US 2010/0236769 A1 proposes an air-conditioning system designed to provide heating and/or cooling of air in an occupied space of a vehicle. The system includes a thermal energy storage device, which is designed to take up heat from a waste-heat source in the vehicle, and a heat exchanger, which is coupled by means of a coolant circuit between the thermal-energy storage device and the occupied space of the vehicle. A second heat exchanger is designed to transfer heat from the thermal-energy storage device into the occupied space of the vehicle and/or from the occupied space of the vehicle to the thermal-energy storage device. The thermal-energy storage absorbs thermal energy when the engine is running, and releases the energy when the engine is switched off, in order to heat air that is supplied to the occupied regions of the vehicle.

Furthermore, U.S. Pat. No. 8,887,843 B2 describes a hybrid electric vehicle, which comprises an internal combustion engine and an electrical energy storage unit. The engine and the energy storage unit are configured to provide drive power for the vehicle. The vehicle has a heating core, which is fluidically connected to the engine, the energy storage unit and the vehicle cabin. The fluid circuit may conduct a fluid, e.g. a coolant, which takes up heat from the engine, as a result of which the temperature of the coolant is raised, in order to cool the engine and to conduct this heat to a cooler. The cooler can remove this heat, as a result of which the temperature of the coolant is lowered. Similarly, the fluid can transport heat from the engine to the heating core. The heating core can transfer this heat to air in the fluid line. This heated air can then be used to heat the cabin.

In other known solutions, use of latent-heat storage devices is proposed.

Thus, U.S. Pat. No. 5,407,130 A describes a vehicle heating system for use with an engine having a fluid cooling circuit, in which a heat storage battery stores latent heat while the engine is operating, and the latent heat is later used to supply heat to the engine and to a passenger-compartment heating system during a subsequent use of the vehicle. A bypass circuit, for bypassing the heat storage battery, is provided within the heating system, thereby preventing recharging of the heat storage battery until the engine of the vehicle has attained a desired operating temperature.

Unlike vehicles having internal combustion engines, in some plug-in electric vehicles, such as battery electric vehicles, there is no significant excess thermal energy available for heating a passenger compartment. Solutions are known in the prior art in which electrical energy, for heating the passenger compartment, is extracted from a drive battery of the electric vehicle. In this case, the electrical energy may be supplied, for example, directly to one or more heating elements (typically PTC (positive temperature coefficient) heating elements), an efficiency of close to 1 being achieved. However, the electrical energy may also be used to operate an electrically operated heat pump, by which an efficiency of $>1$ can be achieved. A disadvantage is that the electrical energy extracted from the drive battery is no longer available for driving the plug-in electric vehicle, and therefore reduces its range.

For this reason, as a remedy, latent-heat storage devices are also used in plug-in electric vehicles for heating a passenger compartment.

For example, US 2012/0152511 A1 proposes a latent-heat storage device (latent-heat thermal energy storage, LHTES) for an electric vehicle (EV). The latent-heat storage device comprises a chamber, a multiplicity of thermal-conductivity enhancement units, which are arranged in the chamber, and a phase-change material (PCM), which is filled into the chamber to enable cooling energy or thermal energy to be stored. The cooling or thermal energy is generated when the electric vehicle is charged, and the cooling or thermal energy is retrieved when the electric vehicle is driven, in order to regulate the temperature of a passenger compartment of the electric vehicle.

As is known from the prior art, the heat for heating a passenger compartment of a plug-in electric vehicle may also originate from specific components of the plug-in electric vehicle.

For example, U.S. Pat. No. 5,647,534 A describes a device for heating the interior of an electric vehicle having an air-cooled high-temperature battery. The waste heat of the high-temperature battery is supplied to the interior via a fluid circuit, which has a heat exchanger that can be loaded, in a controllable manner, with the exhaust air of the battery and with fresh air. The fluid circuit is also connected to, and cools, heat-generating components of the electric drive system.

Known from the online news source "Automotive IQ" (available under https://www.automotive-iq.com/electrics-electronics/articles/electric-vehicle-heating-and-cooling) is a cooling system of an electric vehicle. The cooling system is designed to take up heat from electric circuits and from a drive motor. A cooling circuit of the drive motor/electronics is coupled to a cabin cooling system by a heat exchanger. A coolant circuit reverses the effect, to re-liquefy the gas. In hot weather, the original cooling circuit removes the heat. The cabin heating and cooling circuit, which is formed by a glycol circuit, can cool the vehicle via the coolant circuit. In a heating mode, the cabin coolant circuit uses a resistor element for heating. The cooling circuit of the drive motor/electronics may be connected to the cabin heating circuit via control valves. When the two circuits are connected to each other, the waste heat of the motor and of the electronics can be used to heat the cabin, the resistor element being used as a second heat source.

Described in the technical article by Ohno, H. et al., "Development of Waste Thermal Energy Recovery Heat Pump", (available under https://www.calsonickansei.co.jp/en/assets/pdf/innovation/technical-review/vol11/p46-51.pdf on the website of the company Calsonic Kansei, Japan), is a heat-pump system, which recovers the waste thermal heat in electric vehicles (EV) and comprises a HVAC ("heating, ventilation and air-conditioning") system. Waste heat from driving components such as motors and converters is thus used as a heat source for interior heating.

In view of the outlined prior art, the field of heating of passenger compartments of plug-in electric vehicles still offers room for improvements.

SUMMARY

The disclosure provides various embodiments of a plug-in electric vehicle and method for heating passenger compartments of plug-in electric vehicles that are easily implemented, and require little additional equipment while enabling the plug-in electric vehicle to be heated in an effective manner when external temperatures are low, without compromising a range of the plug-in electric vehicle.

It must be pointed out that the features and measures that are listed individually in the following description may be combined with each other in any technically appropriate manner, and indicate further designs of the invention. The description additionally characterizes and specifies the invention, in particular in connection with the figures.

The vehicle and method according to one or more embodiments for heating a passenger cabin can be applied on a plug-in electric vehicle that comprises components such as an electric drive motor, a rechargeable battery for supplying the electric motor, a power electronics unit for providing and regulating electrical power between the rechargeable battery and the electric drive motor, and possibly an internal-combustion engine.

A "vehicle" within the meaning of this disclosure is to be understood to mean, in particular, a passenger car, a lorry (truck), a semitrailer or a motor bus. The term "designed to" or "configured to" within the meaning of the disclosure is to be understood to mean, in particular, specially programmed, configured or arranged for the purpose.

The term "plug-in electric vehicle" within the meaning of the invention is to be understood to mean, in particular, both a battery electric vehicle (BEV) and a plug-in hybrid electric vehicle (PHEV), which typically includes an internal combustion engine that may also provide driving torque for the vehicle, or may be configured to power an electric machine operating as a generator. Plug-in electric vehicles are charged, during a standstill phase, by being plugged into the mains electricity supply system. In this application, the colloquial term "battery", "traction battery", or "drive battery", is also used for a rechargeable accumulator.

In one or more embodiments, while the plug-in electric vehicle is in a standstill phase, at least one of the above-mentioned components is heated, at least partly, to a predefined temperature by means of externally supplied electrical energy. In addition, in an operating phase of the plug-in electric vehicle, thermal energy is conducted from the at least one component to the passenger cabin.

The thermal energy supplied by the heating may easily be used for heating the passenger cabin, for example by means of the cooling devices that are present in such vehicles in any case, such that, besides the provision of comfort for users of the plug-in electric vehicle, a considerable expansion of a range of the plug-in electric vehicle can advantageously be achieved, in comparison with electrical heating from the rechargeable battery. A requirement for additional equipment is limited substantially to heating means necessary for providing heat. As a further positive effect, owing to the increased temperature at least the heated component can be operated with an improved starting behavior and, for example, lesser friction, at the beginning of a start phase of the plug-in electric vehicle.

Preferably, the step of heating the at least one component is initiated beforehand by a user. In this way, it is possible to specify a defined course of a charging operation, during the standstill phase of the plug-in electric vehicle, by which individual wishes of the user can be taken into account. The initiation by the user may be effected, for example, by means of a user interface ("human machine interface", HMI), which, in a simple case, may consist of a switch.

In various embodiments, heating the at least one component is dependent on an actual and/or predicted or forecast external or ambient temperature during a planned or anticipated trip. In this way, a user may be reminded of a possible execution of the heating, or the heating may also be initiated independently of a user if, for example, a predefined wait time for action by the user with respect to initiation has elapsed.

Heating the at least one component may be effected to a predefined temperature, which is at least 20 K above an external temperature. In this way, a quantity of heat that may be sufficient for a large number of possible travel distances within the range of the plug-in electric vehicle can be provided for heating the passenger cabin.

In a further aspect, embodiments may include a plug-in electric vehicle comprising components such as an electric drive motor, a rechargeable battery for supplying the electric motor, a power electronics unit for providing and regulating electrical power between the rechargeable battery and the electric drive motor, and, in the case of a plug-in hybrid motor vehicle, an internal combustion engine. The electric drive motor or electric machine may also be designed for a recuperative operating mode or regenerative braking mode of the plug-in hybrid motor vehicle, in which the electric drive motor functions as a generator. Embodiments may also include vehicles having a range extender architecture with an internal combustion engine coupled to a dedicated generator to power a drive motor after battery charge has been depleted.

The plug-in electric vehicle may additionally include the following devices: an electric charging device for charging the rechargeable battery from the mains electricity supply system, at least one electric heating element for heating one of the components, the electric heating element, for the purpose of being supplied with electrical power from the mains electricity supply system, being connected to the electric charging device, and an electronic control unit configured or programmed to control heating of the one or more components while connected to the mains electricity supply system.

According to various embodiments, the electronic control unit is designed to control the electric charging device with respect to the at least one electric heating element, in order, in a standstill phase of the plug-in electric vehicle, to heat at least one of the components, at least partly, to a predefined temperature by means of externally supplied electrical energy.

The advantages enumerated in connection with the description of the disclosed vehicle and method for heating a passenger cabin of a plug-in electric vehicle are fully transferable to the plug-in electric vehicle as described herein.

Embodiments may include at least one electric heating element arranged between the respective component and a thermal insulation element. For the field of vehicle engineering, materials suitable for production of the thermal insulation element are known to persons skilled in the art and need not be mentioned further at this point.

In one or more embodiments, the predefined temperature is at least 20 K above the current external temperature or predicted external temperature during a planned trip. In this way, a quantity of heat that may be sufficient for a large number of possible travel distances within the range of the plug-in electric vehicle can be provided for heating the passenger cabin.

In various embodiments of the plug-in electric vehicle, the at least one electric heating element is realized as a flat heating element and, in an operationally ready state, is in mechanical contact with the respective component. In this way, the heating of the at least one component can be performed in a short period of time and with a low power density, such that formation of sites of greatly elevated temperature ("hot spots") can be prevented. In this way, an increased service life of the at least one electric heating element can be achieved. The flat heating element may be realized, for example, as a foil heating element.

If the plug-in electric vehicle has an internal-combustion engine and is realized as a plug-in hybrid vehicle, a particularly large quantity of heat, for heating the passenger cabin, can be stored as a result of heating within the heat capacity of the engine as well as within the heat capacity of the cooling system of the engine and/or battery.

In various embodiments of the plug-in electric vehicle, the at least one component that is to be heated, at least partly, to a predefined temperature by means of externally supplied electrical energy, is formed by the internal-combustion engine. Owing to its relatively large thermal mass, which also includes a proportion of a usual liquid coolant, it is thereby possible to store a particularly large amount of heat, which can be available in an operating phase of the plug-in electric vehicle.

In various embodiments of the plug-in electric vehicle, for each of the said components at least one electric heating element is provided, for heating the respective component. Each of the electric heating elements in this case, for the purpose of being supplied with electrical power from the mains electricity supply system, is connected to the electric charging device. Furthermore, the electronic control unit is designed to control the electric charging device in respect of each of the electric heating elements. In this way, a quantity of heat that may be sufficient for a preponderant number of possible travel distances within the range of the plug-in electric vehicle can be provided for heating the passenger cabin.

The term "preponderant number" within the meaning of the disclosure is to be understood to mean, in particular, a proportion of more than 50% by volume, preferably more than 70% by volume and, particularly preferably, of more than 90% by volume.

In a further possible design, a PTC heating element may be integrated in a cooling circuit, which cooling circuit flows through the components to be heated or the component to be heated, in order actually to cool these components or this component. So, within the meaning of the disclosure, the cooling circuit may be used to heat the component/s, such that the disadvantages, mentioned at the outset, with respect to the PTC heating elements are avoided.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In the differing figures, parts that are the same are in each case denoted by the same references, for which reason they are also generally described only once.

Figure 1:
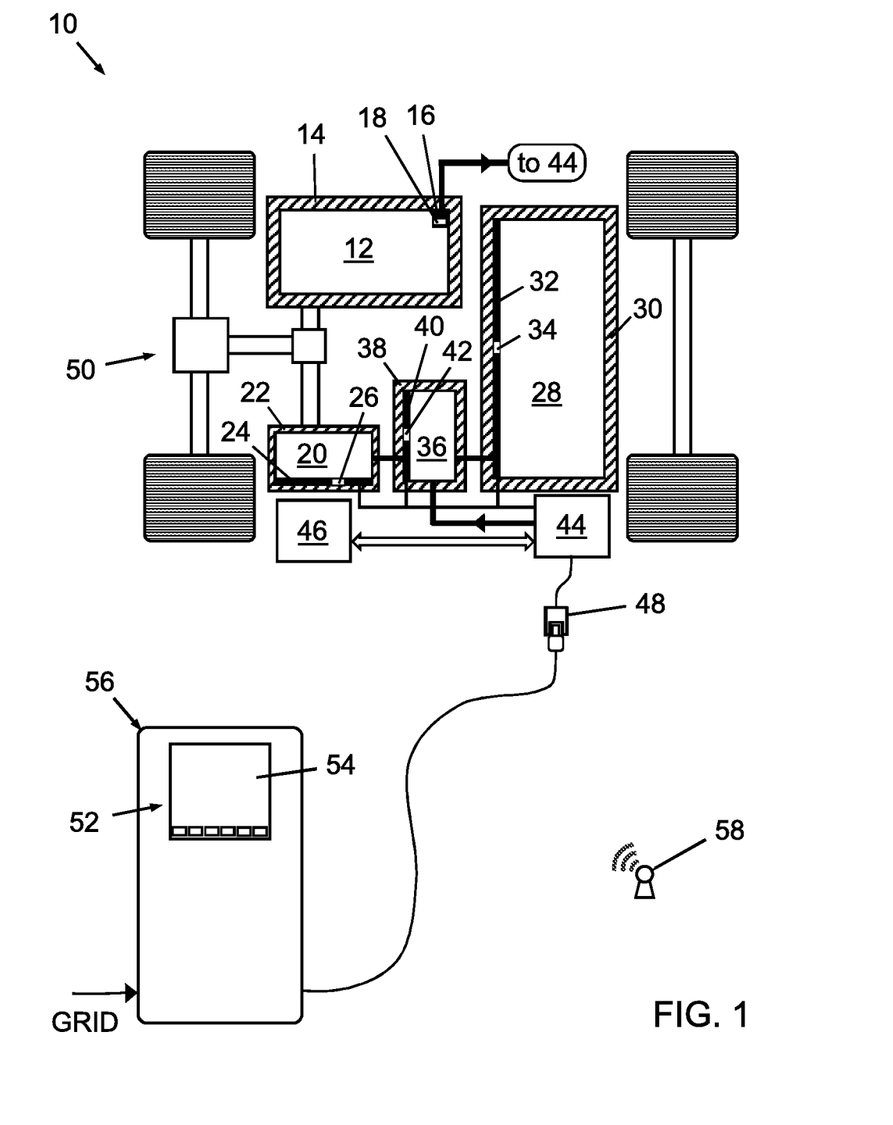
FIG. 1 is a schematic representation of a representative embodiment of a plug-in electric vehicle according to the disclosure.

FIG. 1 shows a schematic representation of a plug-in electric vehicle 10 according to a representative embodiment. In this specific embodiment, the plug-in electric vehicle 10 is realized as a plug-in hybrid motor vehicle in the form of a passenger car and, in the usual manner, has a passenger cabin for accommodating a driver and other passengers. In other embodiments, the plug-in electric vehicle may be realized, for example, purely as a battery electric vehicle.

The plug-in electric vehicle 10 has an electric drive motor 20 and, electrically connected thereto, a rechargeable battery 28, realized as a lithium-ion accumulator, for supplying the electric drive motor 20. A power electronics unit 36 of the plug-in electric vehicle, based on a multiplicity of IGBTs ("insulated-gate bipolar transistors"), serves to provide and regulate electrical power between the rechargeable battery 28 and the electric drive motor 20 and, in corresponding manner, is electrically connected to the rechargeable battery 28 and the electric drive motor 20. A nominal power of the electric drive motor 20 may be, for example, 60 kW.

The electric drive motor 20 is also designed for a recuperative operating mode or regenerative braking mode in which the electric drive motor 20 functions as a generator. The power electronics unit 36 is additionally designed to transmit electric current from the electric drive motor 20 to the rechargeable battery 28 during the recuperative operating mode, in order to increase the charge state of the rechargeable battery 28.

The plug-in electric vehicle 10 is additionally equipped with an internal-combustion engine 12. A maximum power of the internal-combustion engine 12 may be, for example, 40 kW.

In the exemplary embodiment represented, the internal-combustion engine 12 and the electric drive motor 20 are arranged as a parallel hybrid. Both motors 12, 20 are designed to act upon the drive train 50 at the front axle of the plug-in electric vehicle 10. As a full hybrid, the plug-in electric vehicle 10 may be driven, in a purely electric driving mode by the electric drive motor 20, in a driving mode only by the internal-combustion engine 12, and in a combined driving mode by both motors 12, 20. Exemplary embodiments relating to power-branching hybrids (power-split) and also relating to serial hybrids may also be realized within the meaning of the invention.

The plug-in electric vehicle 10 has an electric charging device 44 for charging the rechargeable battery 28 from the mains electricity supply system. For this purpose, the electric charging device 44 is electrically connected to an electrical connector 48, known per se, that is suitable for vehicles, and that is realized as a socket connector and arranged on an outside surface of the plug-in electric vehicle 10. An electronic control unit 46 of the plug-in electric vehicle 10 has signal and data connections to the electric charging device 44, and is designed, at least, to control and monitor the charging operation.

The electric drive motor 20, the power electronics unit 36, the rechargeable battery 28 and the internal-combustion engine 12 are to a large extent surrounded by shape-adapted thermal insulation elements 14, 22, 30, 38. Polymer rigid foam, for example expanded polypropylene (EPP), but also any other material considered appropriate by persons skilled in the art, may be used as a material for the thermal insulation elements 14, 22, 30, 38.

The electric drive motor 20, the power electronics unit 36, the rechargeable battery 28 and the internal-combustion engine 12 are each equipped with an electric heating element 16, 24, 32, 40 for heating the respective component 12, 20, 28, 36. For the electric drive motor 20, the power electronics unit 36 and the rechargeable battery 28, the electric heating elements 16, 24, 32, 40 are realized as flat heating elements, in an operationally ready state are in mechanical contact with the respective component 20, 36, 28, and are arranged between the respective component 20, 36, 28 and the thermal insulation element 22, 38, 30 that to a large extent surrounds the component 20, 36, 28.

The internal-combustion engine 12 is equipped, in one of its liquid cooling channels, with an electric heating element 16, realized as a heating cartridge, which has an integrated temperature sensor 18 that has a signal connection to the electric charging device 44.

The electric heating elements 16, 24, 32, 40, for the purpose of being supplied with electrical power from the mains electricity supply system, are connected to the electric charging device 44. Integrated in each of the flat heating elements 24, 32, 40 is a temperature sensor 26, 34, 42, which has a signal connection to the electric charging device 44. The electronic control device 46 is designed to control the electric charging device 44 with respect to each of the electric heating elements 16, 24, 32, 40.

Figure 2:
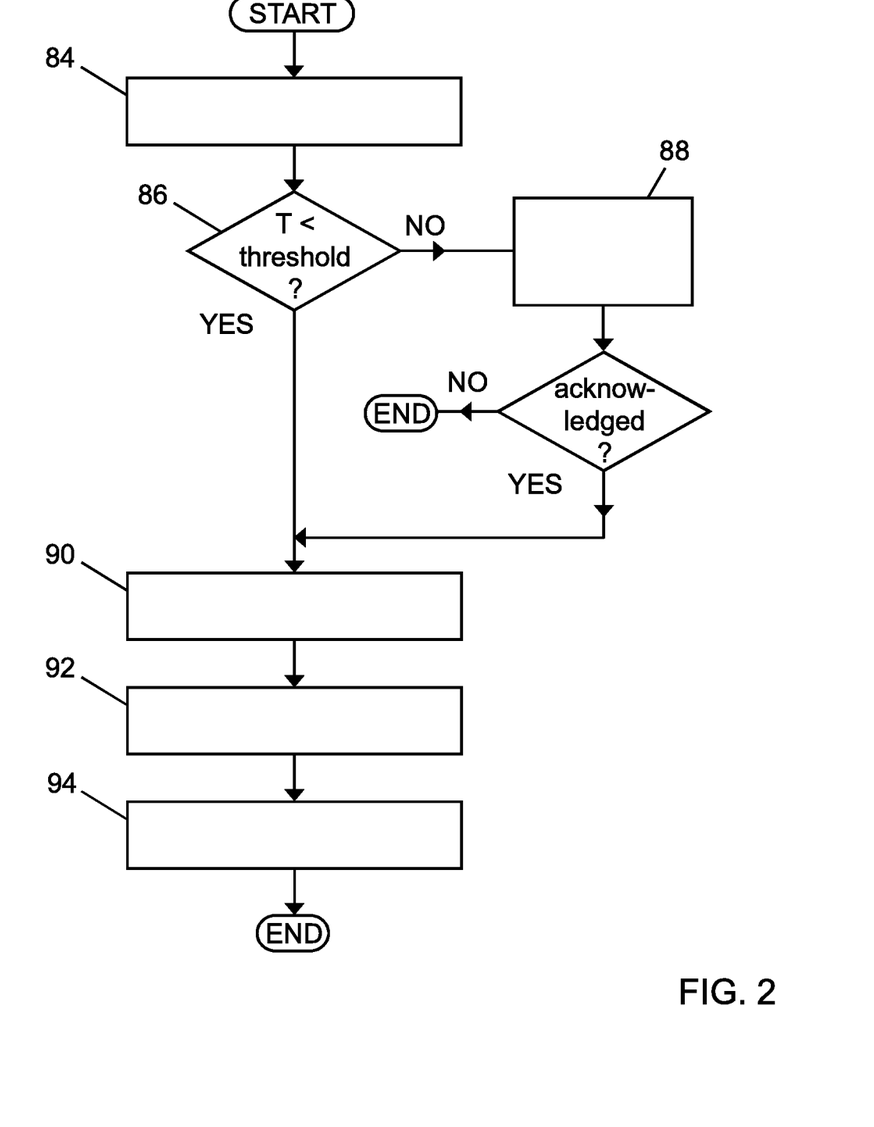
FIG. 2 is a flow diagram illustrating operation of a vehicle or method according to the disclosure for heating a passenger cabin of a plug-in electric vehicle.

One embodiment of a method for heating a passenger cabin of the plug-in electric vehicle 10 is described in the following on the basis of FIG. 1 and a flow diagram, which is shown in FIG. 2.

The electronic control unit 46 is designed to execute the method automatically, and for this purpose may comprise a software module for automatically executing steps of the method, in which case these method steps to be executed may exist as executable program code. The electronic control unit 46 may be equipped with a digital data storage unit, in which the executable program code can be stored, and may additionally comprise a processor unit, by means of which the program code may be executed.

In preparation for execution of the method, it is assumed that all participating devices and components are in an operationally ready state.

In a step 84 of the method, in a standstill phase of the plug-in electric vehicle 10 an electrical plug-in connection is established between the vehicle-side electrical connector 48, i.e. the electric charging device 44, and a stationary charging station 56, which is connected to the electrical power grid. The stationary charging station 56 has a human-machine interface (HMI) 52, having a display unit 54, and having an external-temperature sensor 58, the output signal of which is displayed at the stationary charging station 56 and received, for example wirelessly, by the electric charging device 44 or, alternatively, by the electronic control unit 46. Alternatively, or in combination, vehicle 10 may also have an HMI for controlling heating of one or more components of the vehicle while connected to a stationary charging device or station as described in greater detail herein.

Following the establishing of the plug-in connection, the regular method for charging the rechargeable battery 28 of the plug-in electric vehicle 10 proceeds independently of the method for providing subsequent cabin heating as described herein. Depending on the particular application and implementation, some portion of the battery charging current may be utilized by a PTC heater to provide heating of various components used for subsequent heating of the vehicle cabin. Alternatively, heating of various components may only be performed after the battery 28 has reached maximum charge, or after the battery 28 has attained a predetermined threshold, such as 80% of maximum charge.

In a further step 86 of the method, the ascertained external temperature is compared with a predefined threshold value for the external temperature, which may advantageously be stored, for example, in a digital data storage unit of the electronic control unit 46, enabling rapid data access to be achieved.

If the ascertained external temperature or predicted external temperature for a subsequent planned trip is lower than the predefined threshold value for the external temperature, the method is continued with a subsequent step 90. If the ascertained external temperature is equal to or higher than the predefined threshold value for the external temperature, in a step 88 a confirmation prompt, in respect of execution of the method, is displayed on the display unit, and a wait time is started. The wait time may be, for example, one minute. If, within the wait time, no confirmation has been effected by a user at the human-machine interface 52 or an HMI in the vehicle, for example by touching a predefined position on the display unit 54, the method is terminated. If a confirmation has been effected by the user at the human-machine interface 52 within the wait time, the method is continued with the next step 90. As an additional option, the user can select, within preset limits, a desired time for completion by using the human-machine interface 52, a connected mobile device, or an in-vehicle HMI, for example.

In the next step 90 of the method, the electric charging device 44 is controlled by the electronic control unit 46, in order to supply the electric heating elements 16, 24, 32, 40 with externally supplied electrical energy of the stationary charging station 56. As a result of comparison with the temperatures indicated by the respective temperature sensors 18, 26, 34, 42, in the following step 92 the internal-combustion engine 12, the electric drive motor 20, the rechargeable battery 28 and the power electronics unit 36 are heated to a predefined temperature and held at this temperature, which, in this specific embodiment, is 30 K, i.e. at least 20 K above the ascertained external temperature. The individual predefined temperature may be dependent on the external temperature, on the nature of the component, or may be pre-selectable by the user within preset limits. The electronic control unit 46 is configured to ensure, by controlling the electric charging device 44, that the individual predefined temperature is not exceeded in any one of the heated components. If a desired time for completion has been entered or confirmed by the user beforehand, the electronic control unit 46 is configured to calculate an expected duration for the intended step 92 of heating up the components to the individual predefined temperatures, and is further configured to automatically commence the step 92 of heating at a time that is appropriate to meet the pre-selected desired time for completion, based on the calculated expected duration.

Following completion of the step 92 of heating, and of the charging operation, in an operating phase of the plug-in electric vehicle 10, in a further step 94 of the method, thermal energy is conducted from the electric drive motor 20, the power electronics unit 36, the rechargeable battery 28 and the internal-combustion engine 12 to the passenger cabin, in dependence on a user request. The transfer of the thermal energy in this case is effected via the cooling circuits, or their heat exchangers, that are present in any case in the plug-in electric vehicle 10 and usually in such plug-in electric vehicles and that are adapted in an appropriate manner, as will be described in more detail herein.

The step 94 of transferring the thermal energy may be ended by the electronic control unit 46, for example in that one or more of the temperature sensors 18, 26, 34, 42 ascertains a temperature below a predefined minimum temperature.

Figure 3:
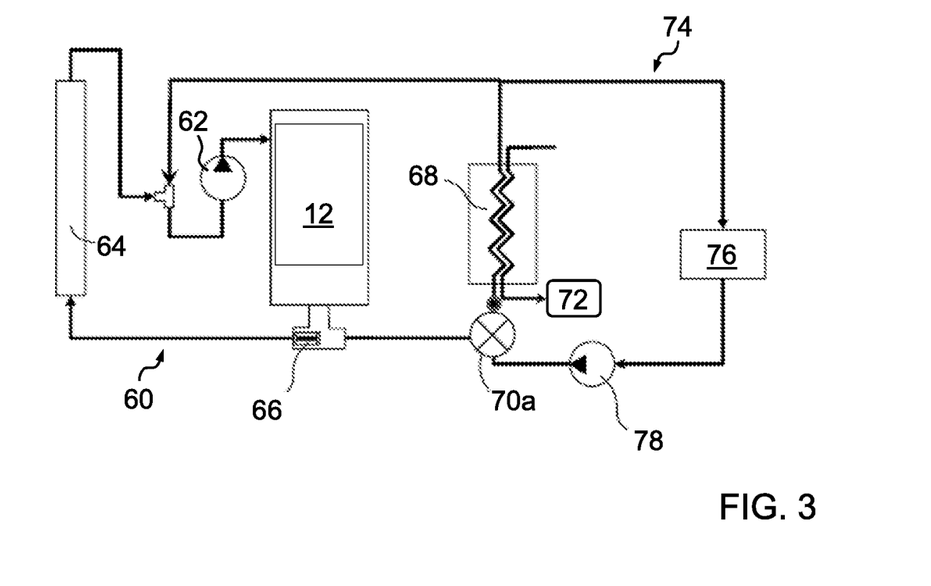
FIG. 3 illustrates a possible installation scheme for providing passenger compartment heating in a plug-in hybrid electric vehicle.

FIG. 3 illustrates a possible installation scheme of cooling devices and cooling circuits that may be present in a conventional plug-in hybrid electric vehicle with passenger compartment heating. In a main cooling circuit 60 a main coolant pump 62, a coolant compartment of the internal-combustion engine 12 and a radiator 64 are connected in series. Controlled by a thermostatic valve 66, the main coolant pump 62 conveys the coolant, usually a water-glycol-mixture with additives, at coolant temperatures below a predefined threshold within the internal-combustion engine coolant compartment only. At coolant temperatures above the predefined threshold, the thermostatic valve 66 opens to allow the coolant to also flow through the radiator 64.

On demand of a user of the plug-in hybrid electric vehicle 10, a heater core 68 can fluidically be connected to the main cooling circuit 60 by operating a heater core isolation valve 70a for transferring heat from the heater core coolant compartment to air, for instance ambient air, to be conducted into the passenger compartment 72.

If the internal-combustion engine 12 is not being operated, by adjusting the heater core isolation valve 70a the heater core 68 can be isolated from the main cooling circuit 60 to fluidically become part of a PTC heater circuit 74. In the PTC heater circuit 74, coolant can be heated up electrically by means of a PTC heater 76, can be provided to the heater core 68, and is recirculated in the PTC heater circuit 74 by an auxiliary coolant pump 78.

Figure 4:
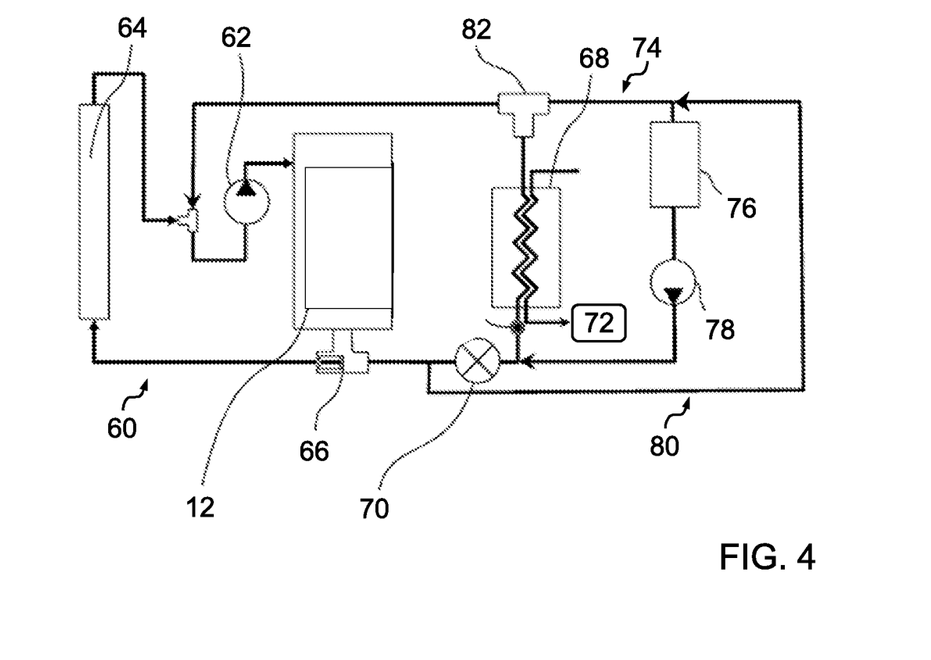
FIG. 4 illustrates a possible embodiment of an installation scheme for providing passenger compartment heating in a plug-in electric vehicle by carrying out the method according to one or more embodiments.

FIG. 4 illustrates a possible embodiment of an installation scheme of cooling devices and cooling circuits that is adapted for providing passenger compartment heating to the passenger compartment 72 of the plug-in electric vehicle 10 by carrying out the method according to one or more embodiments described herein.

In comparison to the scheme pursuant to FIG. 3, the adapted scheme pursuant to FIG. 4 comprises a bypass section 80, which is fluidically coupled to the main cooling circuit 60 with one end at a location between the coolant compartment of the internal-combustion engine 12 and a heater core isolation valve 70, and is fluidically coupled with another end by a controllable 2-way valve 82 to a coolant outlet of the heater core 68.

Figure 5:
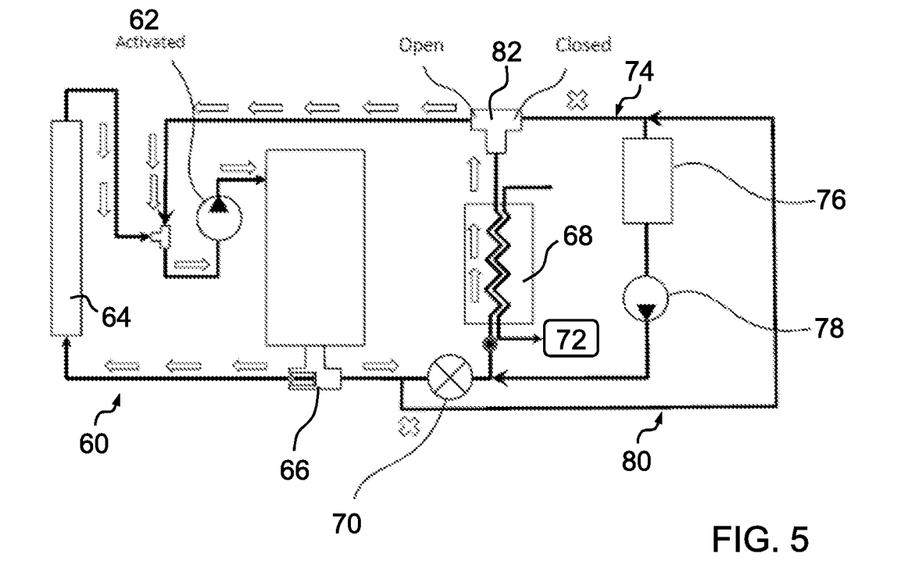
FIG. 5 shows the installation scheme pursuant to FIG. 4 in a state of the internal-combustion engine being operated and rejecting heat.

In FIG. 5, the adapted installation scheme of cooling devices and cooling circuits pursuant to FIG. 4 is shown in a phase in which the internal-combustion engine 12 is operating at nominal operating temperature, and heat is rejected by the radiator 64. The bypass section 80 is fluidically shut off by the controllable 2-way valve 82. The PTC heater 76 and the auxiliary coolant pump 78 are deactivated. Warmed up coolant is conveyed by the main coolant pump 62 through the heater core 68. It is at the discretion of the user of the plug-in electric vehicle 10 to operate the heater core isolation valve 70 according to a desired passenger compartment heating.

Figure 6:
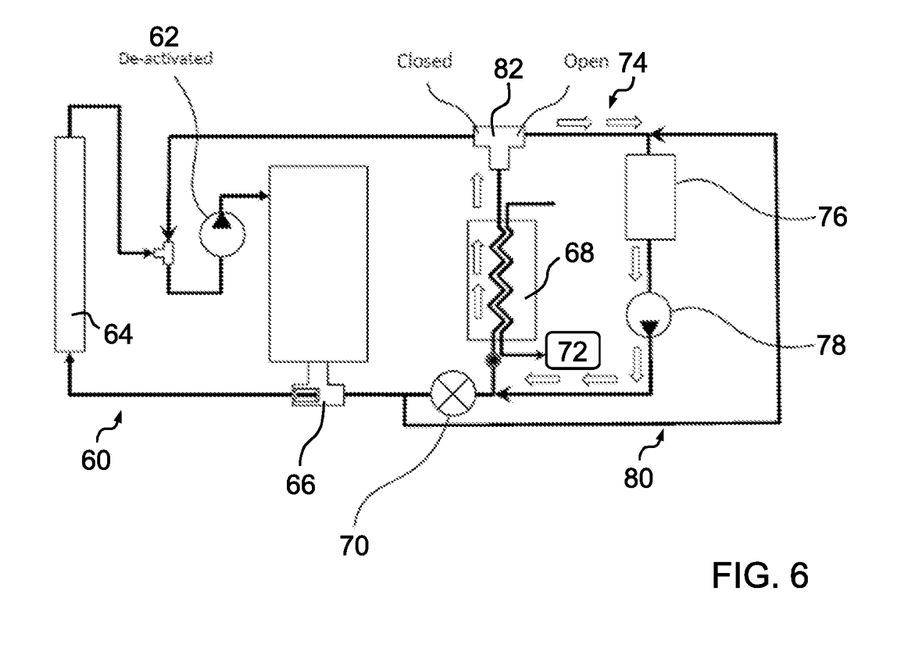
FIG. 6 shows the installation scheme pursuant to FIG. 4 in a state of normal electric driving.

FIG. 6 shows the adapted installation scheme of cooling devices and cooling circuits pursuant to FIG. 4 in a phase of normal electric driving; i.e. without the internal-combustion engine 12 being operated. Consequently, the main coolant pump 62 is deactivated. The heater core isolation valve 70 is closed, and the 2-way valve 82 is controlled to fluidically shut off the PTC heater circuit 74 from the main cooling circuit 60. The PTC heater 76 is activated and the auxiliary coolant pump 78 is controlled to convey the coolant through the heater core 68.

Figure 7:
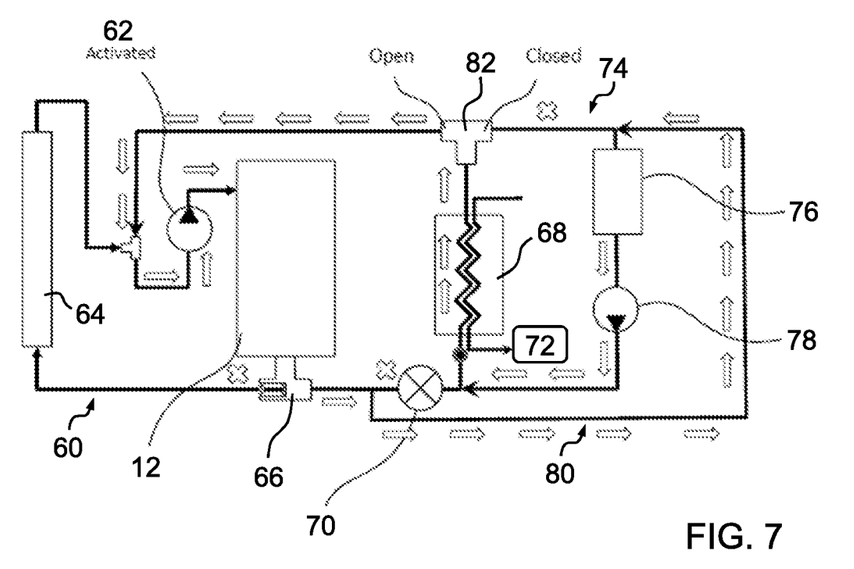
FIG. 7 shows the installation scheme pursuant to FIG. 4 during execution of heating a component to a predefined temperature in a standstill phase of the plug-in electric vehicle.

An operational status of the adapted scheme pursuant to FIG. 4 during execution of the step 92 of heating up the internal-combustion engine 12 to the predefined temperature, which for instance may be pre-selected to a value of 90° C., during a standstill phase of the plug-in electric vehicle 10 is illustrated in FIG. 7. The radiator 64 is fluidically shut off from the main cooling circuit 60 by the thermostatic valve 66, the heater core isolation valve 70 is closed and the controllable 2-way valve is adjusted to fluidically interrupt the connection between the bypass section 80 and the main cooling circuit 60. The PTC heater 76 is operated to heat up the coolant, and the main coolant pump 62 and the auxiliary coolant pump 78 are activated to convey the heated coolant via the heater core 68 through the coolant compartment of the internal-combustion engine 12 and back to the PTC heater 76 via the bypass section 80.

Figure 8:
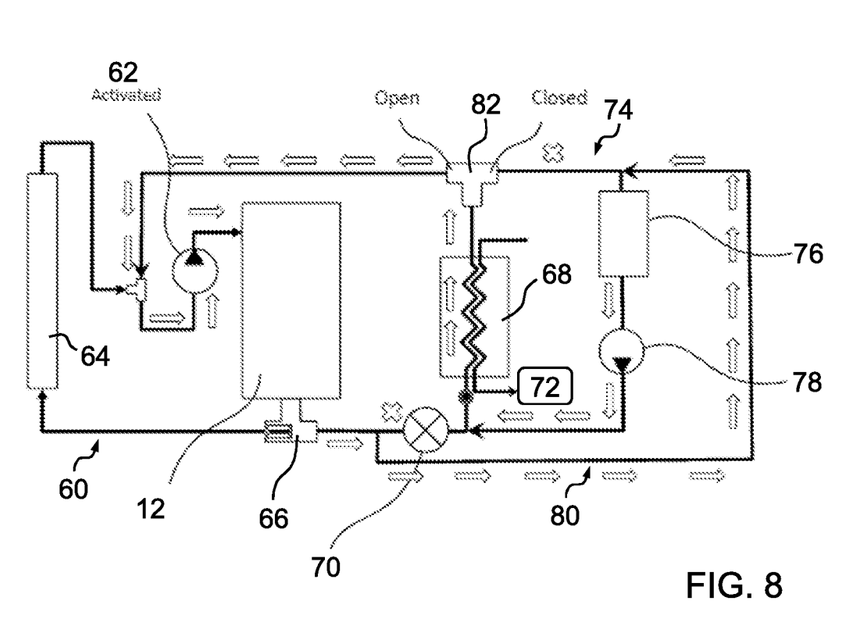
FIG. 8 shows the installation scheme pursuant to FIG. 4 during execution of transferring thermal energy from the heated component to the passenger compartment in an operating phase of the plug-in electric vehicle.

FIG. 8 shows an operational status of the adapted installation scheme after the step 92 of heating up the internal-combustion engine 12 has been completed, and during execution of the step 94 of transferring thermal energy from the heated internal-combustion engine 12 to the passenger compartment in an operating phase of the plug-in electric vehicle 10, in which the internal-combustion engine 12 is not being operated or its coolant temperature is far below the nominal operating temperature. Arrows indicate the path in which the coolant is forced to flow by means of the activated main coolant pump 62 and the activated auxiliary coolant pump 78, via the bypass section 80, the PTC heater circuit 74, through the heater core 68 and back to the coolant compartment of the internal-combustion engine 12. The PTC heater 76 is usually deactivated but may be put into operation in order to boost heat. A consumption of electric power will be lower as in the case of conventional passenger compartment heating, as the coolant is preheated by thermal energy from the heated internal-combustion engine 12.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A method for heating a passenger compartment of a plug-in electric vehicle, the method comprising, by a vehicle controller:
   while the electric vehicle is connected to an external power supply, operating an electric heater to heat a cooling system fluid to a specified temperature exceeding an external ambient temperature to store thermal energy in at least one of an electric machine and a traction battery;
   calculating a required duration for heating of the cooling system fluid to the specified temperature and automatically starting the electric heater at a time based on a pre-selected time for completion and on the calculated required duration; and
   controlling the cooling system to extract thermal energy from the at least one of the electric machine and the traction battery to heat the passenger compartment of the vehicle during operation of the vehicle after disconnection from the external power supply.

2. The method of claim 1 wherein the specified temperature corresponds to a temperature difference relative to the external ambient temperature.

3. The method of claim 2 wherein the specified temperature is at least 20 K above the external ambient temperature.

4. The method of claim 2 wherein the specified temperature is received from user input at a human-machine interface.

5. The method of claim 4 wherein the human-machine interface is located within the vehicle.

6. The method of claim 4 wherein the human-machine interface is located on an external charging station.

7. The method of claim 1 wherein the cooling system is configured to store thermal energy in an internal combustion engine.

8. A vehicle comprising:
   an electric machine configured to drive vehicle wheels;
   a traction battery coupled to the electric machine;
   a power electronics unit connected to the electric machine and the traction battery;
   an electric charger configured to provide power from an external power source to charge the traction battery;
   a cooling system having a liquid coolant and configured to circulate the liquid coolant to heat or cool at least the traction battery and the electric machine;
   at least one electric heating element;
   a heat exchanger configured to selectively transfer heat from the liquid coolant to a passenger compartment of the vehicle; and
   a controller configured to control the at least one electric heating element while the electric charger is connected to the external power source to heat at least one of the electric machine, and the traction battery to a predetermined temperature above external ambient temperature, to calculate a required duration for heating of the at least one of the electric machine and the traction battery to the predetermined temperature and automatically start the electric heater at a time based on a pre-selected time for completion and on the calculated required duration, and to power-off the at least one electric heating element during operation of the vehicle and transfer thermal energy from the liquid coolant to heat the passenger compartment.

9. The vehicle of claim 8 further comprising an internal combustion engine, wherein the controller is further configured to heat the passenger compartment using the thermal energy from the liquid coolant while the internal combustion engine is not operating.

10. The vehicle of claim 9 wherein the liquid coolant stores thermal energy in the internal combustion engine while the electric charger is connected to the external power source.

11. The vehicle of claim 10 wherein the predetermined temperature is at least 20 K above the external ambient temperature.

12. The vehicle of claim 9 wherein the at least one electric heating element directly contacts at least one of the traction battery, the electric machine, and the internal combustion engine.

13. The vehicle of claim 9 wherein the at least one electric heating element heats the liquid coolant.

14. The vehicle of claim 9 wherein the at least one electric heating element comprises a first electric heating element associated with the traction battery, a second electric heating element associated with the electric machine, and a third electric heating element associated with the internal combustion engine.

15. A hybrid vehicle comprising:
   an electric machine configured to drive vehicle wheels;
   a traction battery coupled to the electric machine;
   an internal combustion engine;
   a power electronics unit connected to the electric machine and the traction battery;
   an electric charger configured to provide power from an external power source to charge the traction battery;
   a cooling system having a liquid coolant and configured to circulate the liquid coolant to heat or cool at least the traction battery and the electric machine;
   at least one electric heating element;
   a heat exchanger configured to selectively transfer heat from the liquid coolant to a passenger compartment of the vehicle; and
   a controller configured to control the at least one electric heating element while the electric charger is connected to the external power source to heat at least one of the electric machine, the traction battery, and the internal combustion engine to a predetermined temperature above external ambient temperature, to calculate a required duration for heating of the at least one of the electric machine, the traction battery, and the internal combustion engine to the predetermined temperature and automatically start the electric heater at a time based on a pre-selected time for completion and on the calculated required duration, and to power-off the at least one electric heating element during operation of the vehicle and transfer thermal energy from the liquid coolant to heat the passenger compartment.

16. The hybrid vehicle of claim 15 wherein the at least one electric heating element is configured to heat the liquid coolant and wherein the predetermined temperature is at least 20 K above the external ambient temperature.

17. The hybrid vehicle of claim 16 wherein the at least one electric heating element comprises a first electric heating element configured to heat the liquid coolant and a second electric heating element in contact with at least one of the internal combustion engine, the traction battery, and the electric machine.

\* \* \* \* \*